United States Patent [19]
Mueller

[11] 3,958,873
[45] May 25, 1976

[54] STATIONARY SPROCKET GUARD ASSEMBLY

[75] Inventor: Arthur C. Mueller, Niles, Ill.

[73] Assignee: Bell & Howell Company, Chicago, Ill.

[22] Filed: June 9, 1975

[21] Appl. No.: 585,009

[52] U.S. Cl. ............................... 352/157; 352/129; 226/82; 226/85
[51] Int. Cl.² .......................................... G03B 1/56
[58] Field of Search ........... 352/129, 157, 187, 188, 352/189, 190, 221, 223, 224; 226/76, 80, 82, 85, 86

[56] References Cited
UNITED STATES PATENTS

| 1,966,857 | 7/1934 | Goldhammer | 226/85 |
| 1,969,471 | 8/1934 | Mihalyi | 226/85 |
| 2,172,812 | 9/1939 | Van Weenen | 226/82 |
| 2,205,546 | 6/1940 | Stechbart | 226/82 |
| 2,639,147 | 5/1953 | Fairbanks | 226/82 |

*Primary Examiner*—Monroe H. Hayes
*Attorney, Agent, or Firm*—John E. Peele, Jr.

[57] ABSTRACT

A sprocket assembly for a motion picture projector and a method of threading and removing film from the sprocket assembly is disclosed. By selected configuration of the sprocket and the stationary sprocket guard, including aligner and keeper portions cooperating with the teeth of the sprocket, the film is inserted and removed by simply bending and lowering or twisting and lifting relative to the sprocket assembly.

11 Claims, 7 Drawing Figures

U.S. Patent    May 25, 1976    3,958,873
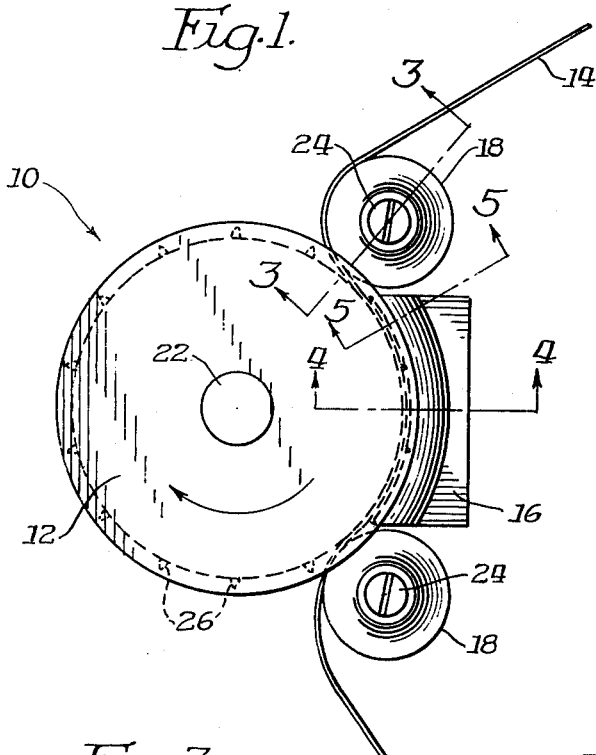
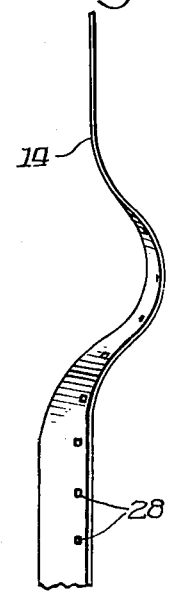
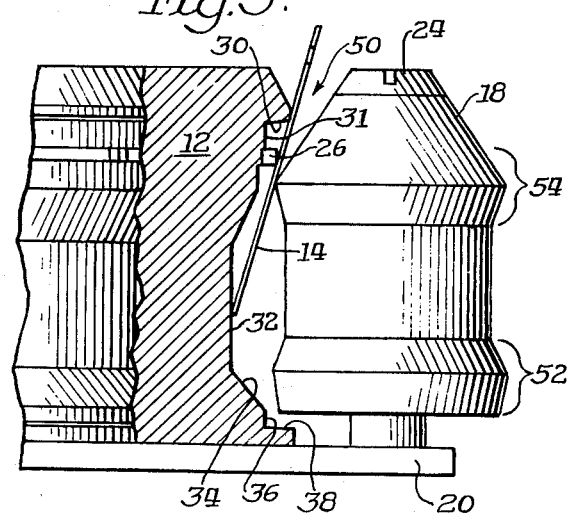
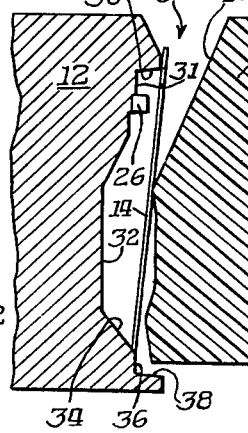
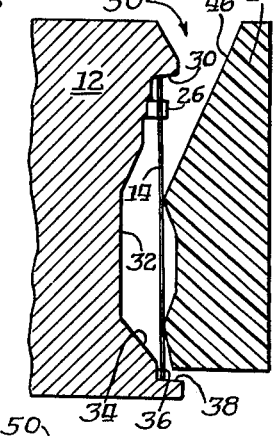
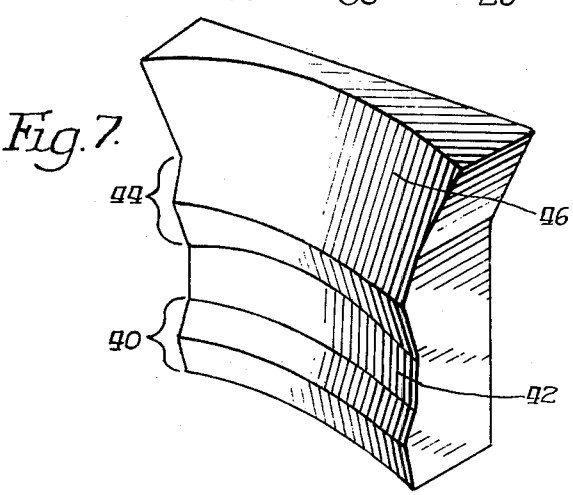
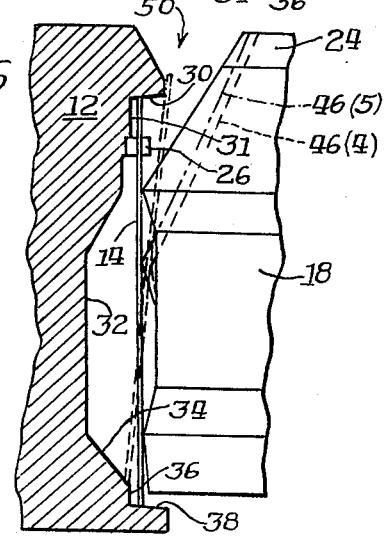

STATIONARY SPROCKET GUARD ASSEMBLY

This invention relates to a novel stationary sprocket guard enabling manual film threading and removal from the film path of a motion picture projector having a sprocket for transporting film.

Manually threaded motion picture projectors having film transporting sprockets have been proposed. However, these projectors have required manual movement of guards about the sprocket to enable proper location of the film on the teeth of the sprocket, and for removal of film from the sprockets. Other projectors have a single lever for positioning of sprocket guards which guide film onto sprockets. This lever must be actuated to permit film threading and removal. Thus, although the threading operation was simplified, the projector was made more complex and more expensive to enable the threading. These problems are overcome by providing a motion picture projector having a film transporting sprocket with a low cost, fool proof stationary sprocket guard. The sprocket guard, which may be molded of plastic, is arranged in close proximity to the sprocket. Further, the sprocket is uniquely shaped to cooperate with the unique configuration of the sprocket guard to accept a film, retain same during projector operation, and to permit ready film removal. In the preferred embodiment, film threading and removal can be performed with one hand of the operator.

In particular, the sprocket is configured with an overhanging rim spaced slightly from the outward or upper sprocket teeth. Along the length of the sprocket from the teeth is a recess; and thereafter an angled ledge terminating above a base shelf with a restraining surface. Spaced slightly from the sprocket is the sprocket guard which is fixed to a mechanism support plate. The sprocket guard is configured with a medial swell or ridge portion hereinafter described as a keeper portion. Proximate the angled ledge of the sprocket, the sprocket guard is provided with an aligning portion of similar configuration to the keeper portion. The simplified threading operation requires the operator only to slightly bend the film and press same about the sprocket in the space between the sprocket guard. Because of the configurations of the sprocket and the sprocket guard, the film is slightly distorted as it is seated on the sprocket and the teeth thereof for projector operation. Further, the cooperating configuration functions to maintain the film on the sprocket during sprocket rotation and projector operation. Removal of film from the film path is accomplished as simply as insertion by slightly twisting the film to distort same and lifting same from the space between the sprocket and the sprocket guard. A roller may be arranged proximate both ends of the sprocket guard to reduce drag of the film over the components.

IN THE DRAWINGS

FIG. 1 is a plan view of a sprocket assembly incorporating the present invention;

FIG. 2 is a representation of a length of film distorted slightly for insertion in and removal from the sprocket assembly;

FIG. 3 is a sectional view of the sprocket and the roller taken along section lines 3—3 in FIG. 1, FIGS. 4 and 5 are sectional views of the sprocket and sprocket guard with film at various stages of insertion, respectively taken along lines 4—4 and lines 5—5 of FIG. 1;

FIG. 6 is an enlarged sectional view of the sprocket shown with elevations of the film guiding components; and FIG. 7 is a perspective view of the sprocket guard of the sprocket assembly.

Referring to the drawings, a sprocket assembly is shown generally at 10. The assembly is a component of a not shown web handling apparatus, such as a motion picture projector. The assembly includes a sprocket 12 for transporting an elongated web having at least a row of perforations near one edge thereof, such as motion picture film 14, along a film path during operation of the apparatus. Further included in the assembly 10 is a stationary sprocket guard 16 and a pair of guide rollers 18, which are supported on a mechanism support plate. The rollers are mounted for rotation about support pins 24 which are fixed in the mechanism support plate 20 at predetermined spacings relative to the sprocket guard and the sprocket. The film path may be as shown in FIG. 1 with the film entering the sprocket assembly by passing about a first guide roller 18, passing between the sprocket 12 and the sprocket guard 16, and exiting the assembly by passing about the second guide roller 18. During operation of the projector, the film is transported through the assembly by engagement of teeth 26 of the sprocket in perforations 28 of the film.

The sprocket 12 is configured with an upper rim or overhanging portion 30 which extends circumferentially slightly beyond the diameter of the sprocket teeth 26. A base circle 31 defines a root circle from which the teeth extend. Axially along the sprocket from the overhanging rim and the sprocket teeth, a recess 32 is formed about the sprocket with a maximum relief approximately in a plane with the edge of the rim and the free ends of the sprocket teeth. The recess extends a short length to each side of a median plane of the sprocket, but extends a greater distance toward the opposite end of the sprocket from the teeth. Proximate this latter end of the sprocket, the recess is ended with an angled ledge 34 which slopes to a film guide face 36, substantially but not necessarily aligned with a base circle 31 from which the teeth 26 extend. The guide face terminates at a lower shelf 38 on which film can engage during a sprocket assembly threading sequence.

The sprocket guard 16, as shown in FIGS. 4, 5, and 7, is seen to have several elevations with respect to a plane through the body of the component. When the guard is assembled with desired spacing relative to the sprocket 12, a reference plane is established by the ends of the teeth 26 of that sprocket. The guard is provided near its lower or inner end with a crowned swell or ridge portion 40, hereinafter called an aligner portion, which extends into the plane defined by the ends of the teeth 26. This aligner ridge portion 40 is spaced from the plane through the guide face 36 of the sprocket by a distance slightly greater than the thickness of a film. Above the aligner, a portion of the sprocket guard is cut away at 42 to clear the guard from engagement with the image area of the film. Approximately medial the length or height of the sprocket guard, another crowned swell or ridge portion 44, hereinafter called a keeper portion, is formed. At the arcuate center of the guard, the keeper portion 44 is slightly clear of the plane through the ends of the sprocket teeth. Although the keeper portion may be concentric with respect to the sprocket, in this preferred embodiment the continuing arcuate ridge portion 44 is of a slightly different radius than the cooperating sprocket so that the ends of the keeper portion 44 extend slightly further toward the sprocket 12 and slightly intersect the plane of the sprocket teeth ends. Beyond the keeper portion, the sprocket guard is relieved at 46 to provide a film access area 50 when assembled with the sprocket. The relative configurations of the sprocket 12 and the rollers 18 the center of the sprocket guard at 46(4) and the ends of the sprocket guard 46(5) are shown in FIG. 6.

As seen in FIG. 1, the sprocket guard is essentially symmetrical about a center line relative to a diameter of the sprocket whereby film is threaded, transported, and removed as efficiently from either above or below the sprocket assembly which may be rotated either clockwise or counterclockwise.

The rollers 18, 18 are arranged at both ends of the sprocket guard 16 to reduce film drag and possible film damage as film moves into and from the sprocket assembly. Further, the function of the rollers causes a controlled bending of the film to maintain a central bend which is oriented substantially centrally of the sprocket guard. Additionally, the rollers are each provided with an aligner portion 52 substantially on the same level along the sprocket as the aligner portion 40 of the sprocket guard. Axially along the rollers, a keeper portion 54 is formed slightly above the upper level of the keeper portion of the sprocket guard. This roller keeper portion 54, which is slightly misaligned relative to the teeth of the sprocket to maintain the film on the sprocket teeth when the film is inserted in the sprocket assembly.

The rollers may be replaced by configuring the sprocket guard with rounded edges about which the film may be passed smoothly and without damage.

Motion picture film is of flexible material which can be deformed or distorted by bending or twisting along almost any axis, and be returned to the initial configuration. The flexibility becomes apparent from a consideration of a typical film path through which film passes in a motion picture projector while being bent back and forth along an axis across its width. Although the film resists bending along a lengthwise axis, such a bend can be made. Generally, a film can be twisted or distorted partially about both axes simultaneously. That is, the film can be twisted along its length over a relatively short length at least from an orientation in which the film changes from a first plane to a plane perpendicular to the first plane. However, by these characteristics of film although quite flexible, distortion about the longitudinal axis is resisted when film is bent about the width axis. That is, as film is bent into a U-configuration about the width axis, the base of the U becomes a straight line along the film width along which the film can be distorted only slightly. When distorted by simultaneous bending and twisting, the film becomes relatively rigid along the resulting straight line.

The present invention uses the principle involving the simultaneous twisting and bending of film to enable easy insertion of and removal of film into and from the film path defined by stationary components. To insert the film in the path about the sprocket the film is grapsed by the operator, bent slightly about the sprocket, and inserted with minimal force into the access space 50. As shown in FIG. 3, the film is inserted along the plane defined by the edge of the rim 30 and the ends of the sprocket teeth 26. Without distortion, the film enters the access space 50 and passes the keeper portions 44 of both the sprocket guard 16 and the rollers 18. While being inserted, the film 14 remains undistorted as the inner edge thereof engages the recessed portion 32 and rides onto the angled ledge 34 of the sprocket 12. As the film is slightly pressed to move further toward projector operating orientation, a slight distortion occurs as the film's bottom edge rides outwardly on the angled ledge 34 of the sprocket from the orientation as shown in FIG. 4 to the orientation as shown in FIG. 5. In this preferred embodiment for handling 16mm film, the maximum film deformation along this central area slightly exceeds the thickness of film which is 0.006 inch. Centrally of the sprocket guard, less distortion can occur than near the outer portion thereof since the keeper portion is recessed further from the plane of the sprocket teeth. The last described movement of the film caused the film edge to ride off the ledge 34 and onto the shelf 38 at about the same instant as the upper portion of the film cleared the overhanging rim 30. As the film regains its linear alignment along the center of the sprocket guard, the film either seats with its perforations 28 on the sprocket teeth 26 or is biased against the teeth until the first rotation of the sprocket 12 causes alignment of the teeth with the perforations.

Following insertion of the film in the space between the sprocket 12 and the sprocket guard 16, the film is precluded from escaping on its own, while being transported, by the combination of the upper rim 30, the shelf 38, and the aligner and keeper portions 40, 44 of the sprocket guard 16. During normal running, the film rides on the base circle 31 and the guide face 36. However, should any reverse forces by applied to the film against the direction of sprocket rotation, the keeper portion 44 of the guard precludes sufficient radial or outward movement of the film relative to the sprocket teeth 26 to move thereover. Since the film cannot escape the sprocket teeth, and cannot escape from beneath the overhang of the rim, inadvertent movement of the film out of the film path is avoided.

Although the film is trapped against inadvertent escape from the film path, the film can be removed from the sprocket assembly 10 with a slight twist by the operator. That is, the operator may twist the film 14 slightly along its length beyond either of the rollers 18, 18 and lift the film from the film path. The film twisting action is in a direction to clear the film from the sprocket teeth and the overhanging rim of the sprocket 12 with minimum distortion to the orientation as shown in FIG. 4. Further lifting of the film causes the film to acquire the orientation shown in FIG. 3, which is essentially clear of the sprocket assembly. Hence, with one hand, the operator can remove the film from the sprocket assembly by a slight twisting and lifting of the film.

As described above, positive film threading is accomplished without movement of the sprocket guard or any other component of the projector. By the configuration of the components of the sprocket assembly, film is not permitted to wander axially with respect to the sprocket during projector operation. Yet, film removal is accomplished with the same easy movements as film threading.

What I claim is:

1. An easily threaded sprocket assembly for an apparatus for handling an elongated web having a row of perforations near one edge thereof, the sprocket assembly into which the web can be manually inserted and removed comprising:
a sprocket having a plurality of teeth spaced about the periphery thereof proximate one end for engaging the perforations in the web, said sprocket having spaced above said teeth an overhanging rim of greater diameter than the ends of said teeth, and having spaced below said teeth a recess of lesser diameter than said teeth, and an angled ledge extending from said recess to a plane substantially aligned with the root of said teeth; and
an arcuately configured stationary sprocket guard positioned adjacent said sprocket, and having an aligned portion proximate said angled ledge of said sprocket and a keeper portion at the approximate middle of the height of the guard;
said sprocket and said sprocket guard being spaced apart a predetermined amount to enable insertion of a web therebetween by slightly bending the web and causing said web to move into apparatus operating condition on said sprocket teeth and under said overhanging rim of said sprocket, said web being restrained from inadvertent escape from said sprocket assembly.

2. The sprocket assembly as in claim 1 including:
a pair of rollers, each arranged on a fixed axis proximate an end of said sprocket guard for causing controlled bend of said web through said sprocket assembly.

3. The sprocket assembly as in claim 2 wherein said rollers include an aligner portion proximate said angled ledge of said sprocket and a keeper portion proximate said teeth of said sprocket.

4. The sprocket assembly as in claim 1 wherein said keeper portion of said sprocket guard is arcuately configured with a radius different from a radius centered on the axis of said sprocket.

5. An easily threaded sprocket assembly for a motion picture projector into which a length of flexible film having perforations along its length is manually inserted for transporting along the film path and from which the film can be manually removed, the sprocket assembly comprising:
a sprocket having teeth about the periphery thereof proximate one end for engaging with the film perforations and having above said teeth an overhanging rim of greater diameter than said teeth, said sprocket having below said teeth a relieved portion of lesser diameter than a base circle for the root of said teeth, and merging from said recess an angled ledge leading to a plane substantially aligned with said base circle at which the ledge merges into a film guide face;
an arcuate sprocket guard fixedly positioned adjacent said sprocket, and having a film aligner portion proximate said angled ledge of said sprocket and a film keeper portion approximately at the middle of the height of the guard;
said sprocket and sprocket guard being spaced apart an amount to enable insertion of film about said sprocket by bending of the film and pressing of said film to move toward projector operating condition on said sprocket teeth and under said overhanging rim, said film being undistorted until slightly before being moved under said overhanging rim, and to enable removal of the film from therebetween by slightly twisting and lifting of the film to distort same to clear the sprocket teeth and said overhanging rim of said sprocket.

6. The sprocket assembly as in claim 5 including:
a pair of rollers arranged on fixed axes proximate the ends of said sprocket guard for causing controlled bend of said film through said sprocket assembly.

7. The sprocket assembly as in claim 6 wherein said rollers include an aligner portion proximate said angled ledge of said sprocket and a keeper portion proximate said teeth of said sprocket.

8. The sprocket assembly as in claim 5 wherein said keeper portion of said sprocket guard is arcuately configured about a radius different from a radius centered in the axis of said sprocket.

9. An easily threaded sprocket assembly for a motion picture projector having a film path into which an elongated film having perforations along its length near one edge is manually inserted for transporting along the film path and from which the film can be manually removed, but cannot inadvertly escape due to projector operation, the sprocket assembly comprising;
a sprocket having teeth about the periphery thereof proximate one end for engaging with the film perforations and having above said teeth an overhanging rim of greater diameter than the ends of said teeth, said ends of said teeth and said overhanging rim defining a plane relative to which film can be passed, said sprocket having below said teeth a relieved portion of lesser diameter than a base circle for the root of said teeth, and an angled ledge merging with said relieved portion and extending to a plane substantially aligned with said base circle against which the film engages during projector operation;
an arcuate sprocket guard fixedly positioned adjacent said sprocket, and having a film aligner portion proximate said angled ledge of said sprocket and a film keeper portion substantially at the middle of the height of the guard, said portions preventing film movement from said sprocket when said film is engaged on said sprocket teeth;
said sprocket and said sprocket guard being spaced apart an amount to enable insertion of film about said sprocket by pressing of said film along said plane defined by said teeth and said overhanging rim to move said film toward projector operating condition under said overhanging rim, said film being undistorted until slightly before being moved under said overhanging rim, and being distorted by said rim when moving from said angled ledge and under said overhanging rim, and to enable removal of the film from therebetween by slightly twisting and lifting of the film to distort same to clear the sprocket teeth and said overhanging rim of said sprocket.

10. The sprocket assembly as in claim 9 including:
a pair of rollers arranged on fixed axes proximate the ends of said sprocket guard for causing bending of said film through said sprocket assembly, each of said rollers having an aligner portion proximate said angled ledge of said sprocket and a keeper portion nearer the plane of said teeth of said sprocket than said keeper portion of said sprocket guard.

11. The sprocket assembly as in claim 9 wherein said sprocket guard is arcuately configured about a radius different from a radius centered on the axis of said sprocket, the central portion of said sprocket guard being nearer said sprocket than outer portions of said sprocket guard.

\* \* \* \* \*